Dec. 14, 1926.

E. S. DICKEY 1,611,105

DIAPHRAGM FOR DRY TYPE GAS METERS

Filed August 30, 1922    4 Sheets-Sheet 1

Dec. 14, 1926.  E. S. DICKEY  1,611,105
DIAPHRAGM FOR DRY TYPE GAS METERS
Filed August 30, 1922   4 Sheets-Sheet 2
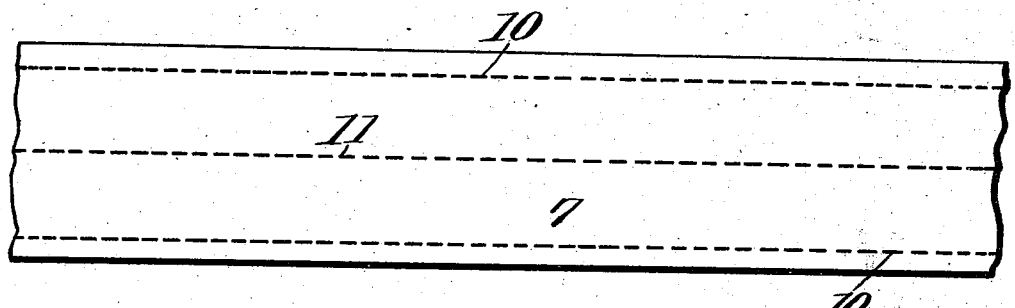
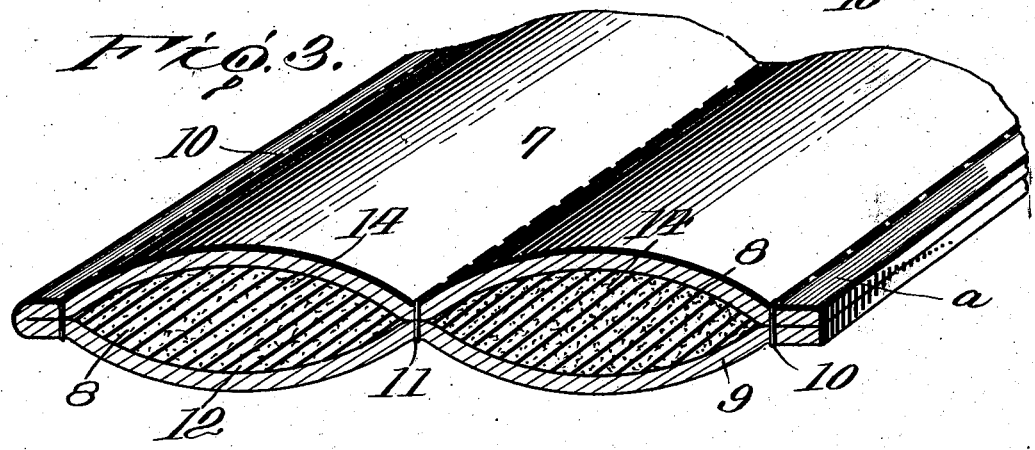
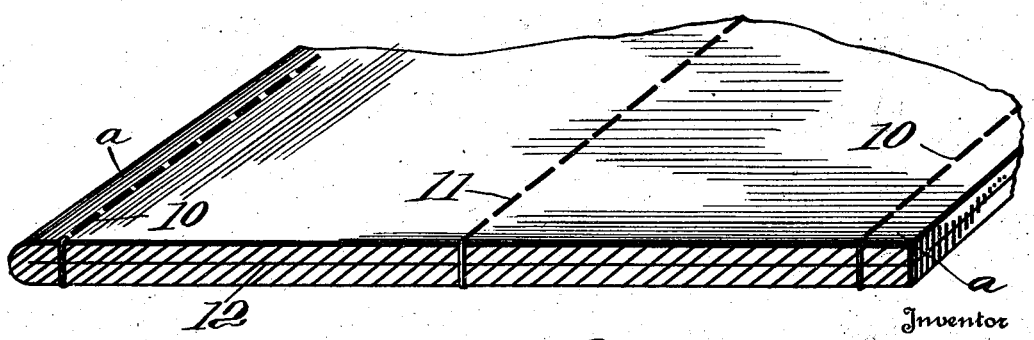
Inventor
Edmund S. Dickey
By Julian W. Johnson
Attorney Dec. 14, 1926.
E. S. DICKEY
1,611,105
DIAPHRAGM FOR DRY TYPE GAS METERS
Filed August 30, 1922  4 Sheets-Sheet 3
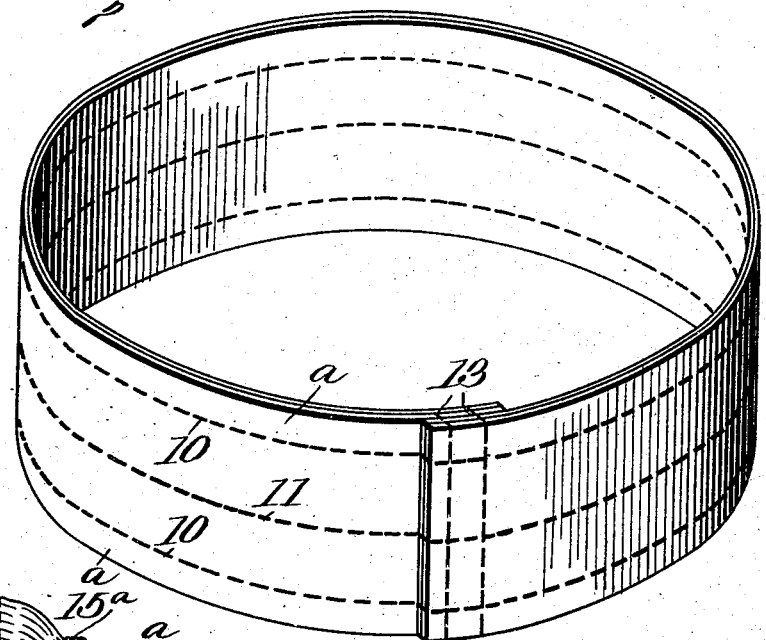
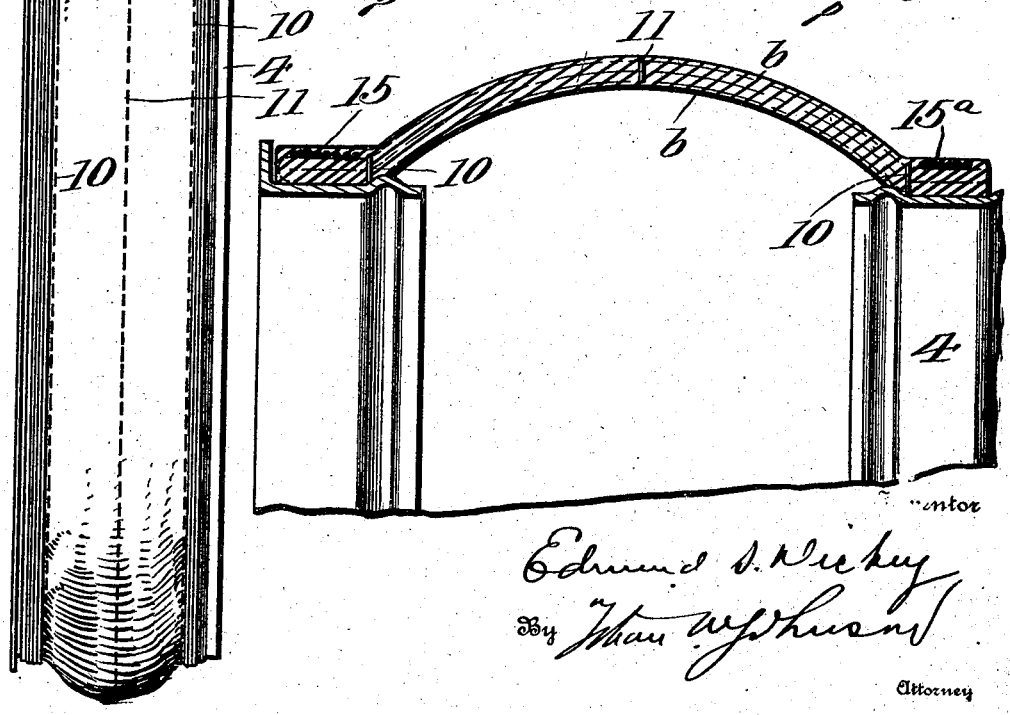

Dec. 14, 1926.  
E. S. DICKEY  
1,611,105  
DIAPHRAGM FOR DRY TYPE GAS METERS  
Filed August 30, 1922    4 Sheets-Sheet 4
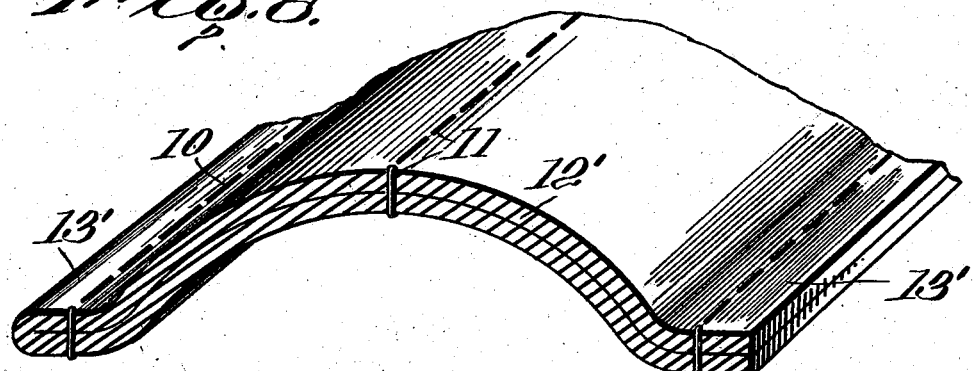
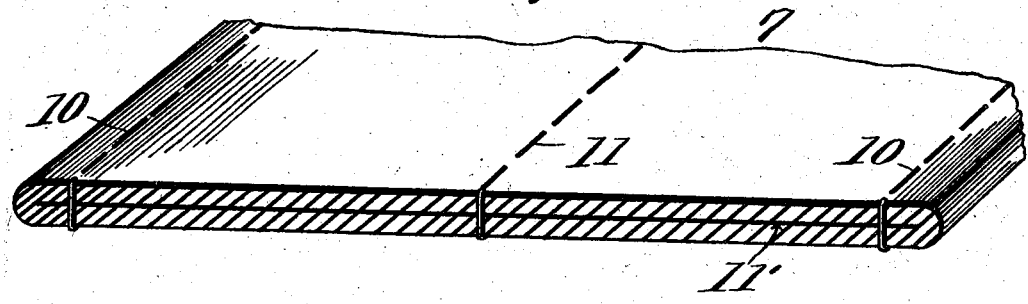
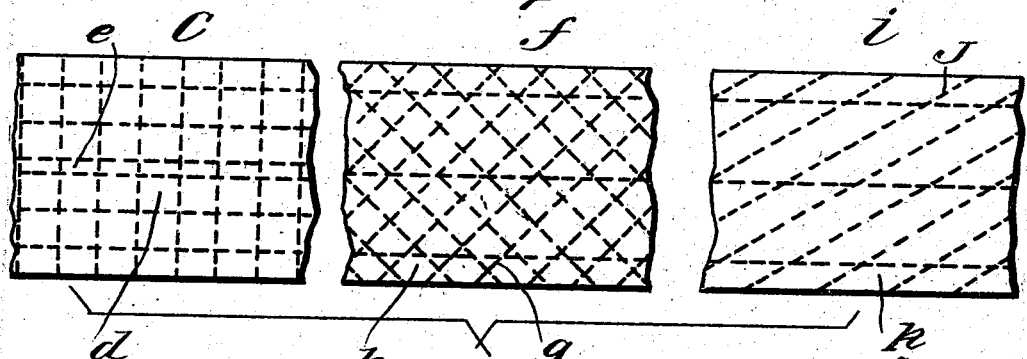
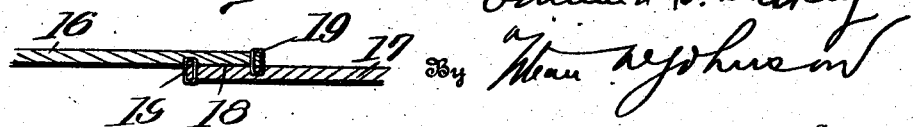

Patented Dec. 14, 1926.

1,611,105

UNITED STATES PATENT OFFICE.

EDMUND S. DICKEY, OF BALTIMORE, MARYLAND, ASSIGNOR TO AMERICAN METER COMPANY, INC., OF NEW YORK, N. Y., A CORPORATION OF DELAWARE.

DIAPHRAGM FOR DRY-TYPE GAS METERS.

Application filed August 30, 1922. Serial No. 585,265.

This invention relates to diaphragms for dry type gas meters.

Generally speaking, the practical meters for measuring gas have been of two kinds, wet and dry, and while the wet type of meter is the most positive instrument for measuring the various gases, its use for domestic purposes was found to be impracticable due to evaporation of water, absorption of water by gases, the possibility and likelihood of the water freezing, etc. The wet meter on account of its many disadvantages, some of which have just been mentioned, has been for domestic use entirely superseded by the dry meter, or one in which there is combined a gastight casing, and gastight diaphragms of the bellows type, the gas passing through the meter and being alternately contained, in passing, in the casing and the diaphragms, and controlled by suitable valves. It is to the diaphragm of these last mentioned meters that my invention relates.

In order that a complete understanding of the invention may be had, both from a structural standpoint, and of the purposes, achievements and advantages of the improvement, the following preliminary statement is made.

Heretofore, so far as I am aware, the bellows portion of the dry type gas meter diaphragms has been invariably made of leather, and particularly of sheep skin, on account of the peculiar physical characteristics possessed by this kind of skin or hide, such as pliability, strength, and absorbent qualities that make it receptive of the oils and other substances with which the leather is treated before going into the meter.

During the period of use of diaphragms made from sheep skin, or during approximately the last eighty years, various attempts have been made to use other grades of leather, natural leather, artificial leather, and various other artificial materials, but without success, resulting finally, therefore, in the absence of better material, in the definite acceptance by all gas companies and meter manufacturers, of the use of a diaphragm, the bellows portion of which is made of sheep skin.

In the preparation of sheep leather for the purpose mentioned, it is especially tanned and made soft and pliable, permitting it to be worked into proper form or shape for diaphragm requirements, and after it is properly formed and shaped into diaphragms, it must be further treated with an application of oils for the purpose of counteracting the gas action on the leather, and preventing the gas from rotting, drying out, shrinking or otherwise affecting the condition of the diaphragm. Furthermore, the materials from which gas is now made for domestic use, are not what they were in the past, which is a subject for practical consideration under present conditions. It used to be, and for many years, gas was generally made from coal, and when so made, no great difficulties were experienced with meter diaphragms, due to the fact that coal had a more or less beneficial or preservative effect on meter leathers. However, within the last twenty-five years, with the introduction of oil and water gases, and various mixed gases, and natural gas, it was found that the condensates and agencies of these gases very quickly attack artificial oils used in the treatment of meter diaphragms, destroying, absorbing, or otherwise eliminating them. This elimination permits the condensates and agencies of the last mentioned gases to attack the diaphragm material, rotting, drying out, bleaching, shrinking, and otherwise seriously affecting it, with the result that the length of service and accuracy of the meter is curtailed. Various animal and vegetable oils have been tried to overcome or minimize the deleterious effects of the gas upon the leathers, but the use of these oils was largely discontinued, and for them, mineral oils of petroleum base were substituted, which were found to be very helpful, and in a large degree, preventing the continued deterioration of meter diaphragms from the action of the newer gases. Nevertheless, leather of the kind mentioned, and other kinds, has many disadvantages, which, as above indicated, have been tolerated and accepted in the absence of better material. Among the disadvantages intimated are the lack of uniformity in the thickness and character of the skin; its tendency to dry out and become hard and, therefore, resistive of the gas flow through the meter, and its tendency to shrink, with the resultant inaccurate measurement of gas, and other disadvantages known to persons skilled in this art.

Furthermore, on account of the lack of uniformity in thickness, or the presence of "spots" in the leather of which the diaphragms are made, the bellows are caused at certain points to move inwardly between the diaphragm rings in collapsing, thus causing the curtailment of capacity, and consequent inaccurate measurement. And still further, no matter how thoroughly the leather is treated, the oils do not completely penetrate or permeate the entire thickness of the leather, and the action of the gas on the interior sections of the diaphragm in time removes the oils and permits drying of the leather with the consequent disadvantages and results incident to such condition.

To overcome the disadvantages of leather diaphragms, which disadvantages have been above indicated, I provide one, the bellows portion of which is constructed of plates of textile material, preferably a suitable woven fabric, constructed in a novel manner, and treated in a novel manner, to not only completely seal the minute interstices of the fabric, and render the diaphragm absolutely impervious to gas (as it must be), but at the same time to lubricate the materials for smooth and uniform movement in expanding and collapsing of the bellows, thus reducing to a minimum the possibilities for gas absorption of the artificial lubricants of the bellows material, thereby maintaining the continued flexibility of the diaphragm. In producing such a diaphragm, I have as a further object, to so construct the flexible diaphragm material or fabric as to render it more effectually receptive of the lubricating and sealing material, as well as giving to it a feature that will prevent any portion of the bellows from folding inwardly between the diaphragm rings upon the collapse of the diaphragm.

Following the use of textile material, is another feature deserving of consideration. The stitching together of sections of leather diaphragms now commonly used, as shown in Fig. 11, is a tedious operation requiring great care to prevent the stitches from being carried all the way through the material, for if they are carried through the leather, complete punctures or perforations are made that give trouble later from seam leaks, no matter how thoroughly the leather is treated or saturated with the artificial oils usually employed. Whereas, incident to stitching entirely through layers of textile fabric, there are none of these disadvantages, since the character of the stitching is the same as that of the material which surrounds it, and if anything, augmenting the filling possibilities rather than detracting from them.

I have found by experiment that a closely woven fabric, known as middy twill muslin, when made and treated in accordance with my invention, serves admirably without any of the disadvantages and objections heretofore noted, as a substitute for sheep skin in the construction of dry type meter diaphragms, the explanation of the construction and treatment of which follows:

In the drawings illustrating the invention:

Fig. 2 is a plan view of a member or strip of textile fabric, of which the bellows portion of the diaphragm is made.

Fig. 3 is a perspective cross sectional view of the strip, the thickness of the layers of material being very greatly exaggerated.

Fig. 4 is a perspective view of the strip after the filling material has been worked into the interstices of the material.

Fig. 5 is a perspective view of the strip after it has been filled, formed into a band preparatory to attaching it to the metallic diaphragm rings.

Fig. 6 is an edge elevation showing the strip attached to the rings.

Fig. 7 is an enlarged cross sectional view of a part of the diaphragm, the bellows portion of which is made of my improved material and secured to the rings, it being intended to show the final condition of the fabric after it has been treated between its layers, and also upon its inner and outer periphery.

Fig. 8 is a perspective sectional view of the bellows portion of the diaphragm illustrating a modification wherein said portion is shaped preparatory for attachment to the diaphragm rings.

Fig. 9 is a perspective sectional view showing the bellows strip woven in tubular form.

Fig. 10 is a fragmentary group of plans of parts of the bellows strip showing different forms of stitching the layers together.

Fig. 11 is a sectional view showing the present manner of stitching sections of a leather diaphragm together.

Figure 1:
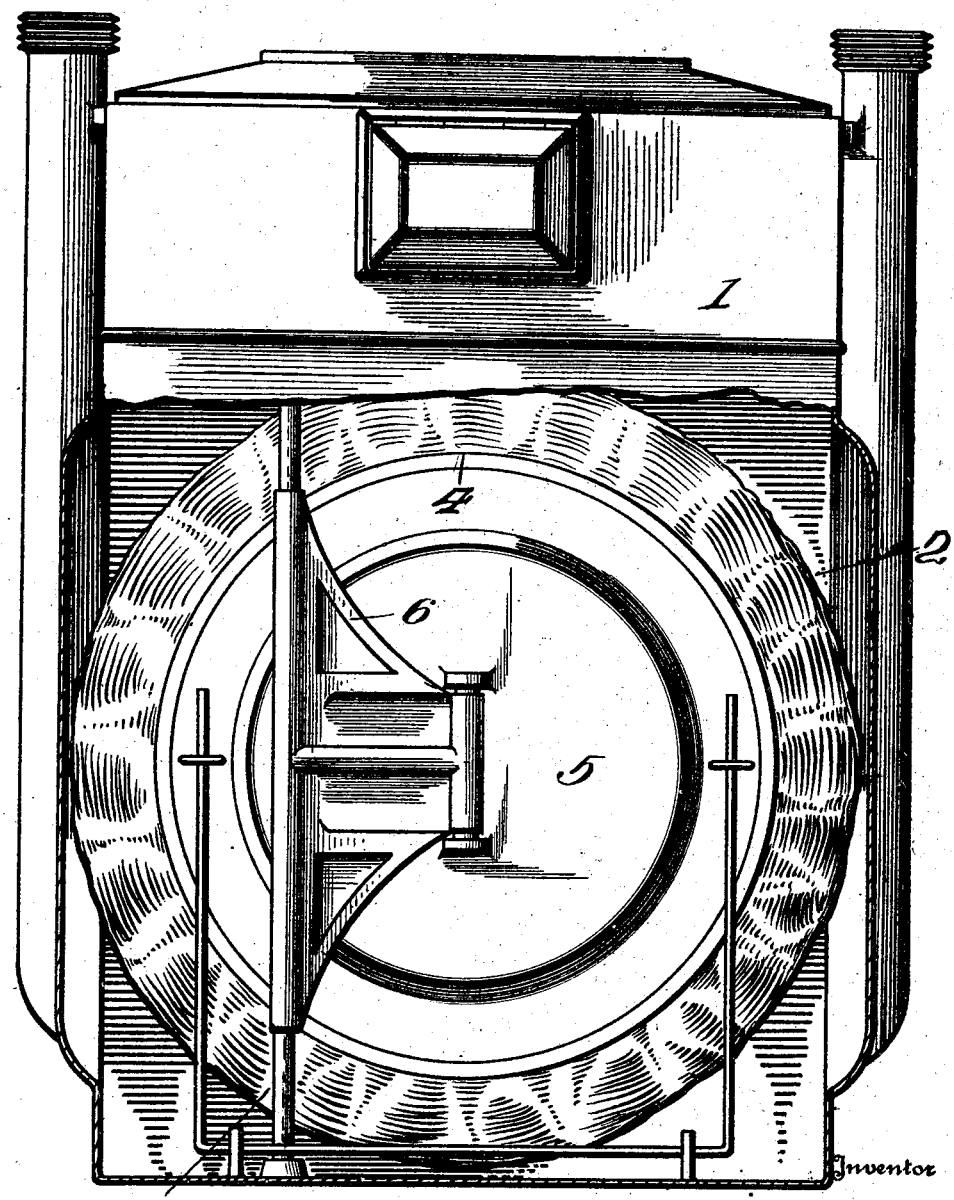
Fig. 1 is an elevation of a dry type meter, the parts broke away to show the diaphragm therein.

Referring to the drawings, the numeral 1 designates the casing of a conventional dry type meter for measuring gas for domestic purposes. The numeral 2 designates the diaphragm as a whole, which is of the bellows type, and fitted in the present instance, with my improved bellows material. The numeral 3 designates the bellows portion of the diaphragm, 4 the outer ring, 5 the flagstaff plate, which is soldered to the rings, and 6 the flag.

No further description, it is believed, will be needed with regard to the parts of the meter, because as before intimated, the invention here resides in the diaphragm itself.

The numeral 7 designates a strip of textile material formed by folding a piece of fabric of suitable width upon itself, thus forming two plates or layers 8 and 9. As heretofore suggested, the material is preferably, closely woven fabric, the layers being stitched together at their side marginal edges, as indicated at 10, and there is provided a central longitudinal row of stitches 11, which divides the strip into two longitudinal pockets 12. The central row of stitching serves a four-fold purpose:

First: To connect the layers of the strip together, and thereby eliminate any tendency that they may have to separate in the expanding and collapsing movement to which the diaphragm is subjected in use or operation;

Second: To increase the convenience incident to filling the strip with preservative sealing lubricant to be introduced between the layers;

Third: The provision by the stitches of a central stiffening arc for the bellows to prevent any portion of the bellows from folding inward in the operation of expanding and collapsing; and Fourth: The formation of the pockets by the stitches enables the filling material to be more uniformly and conveniently worked into the interstices of the fabric.

As shown in Fig. 9, the strip may be woven in tubular form, in which case the lines of stitching 10 may, if found desirable, be eliminated, and in either event, when the central row of stitching 11 is made, the result will be the pockets 11', similar in all essential respects to the pockets 12.

These fabric strips, consisting as they do of the two layers 8 and 9, are made in varying widths, and are cut in varying lengths for making diaphragms of different sizes, and the ends of the strips are overlapped for a suitable distance and stitched together, as indicated at 13, Fig. 5, or the strips may be woven or formed in continuous rings of various sizes and widths with openings left in the pockets for the introduction of the filling and sealing material.

As shown in Fig. 8, I may, previous to the attachment of the strip to the diaphragm rings, shape the strip so that it has a dome portion 12' that merges into laterally extending edge flanges 13', so that when the strip is secured to the rings, the portion of the bellows adjacent the dome portion will show no pucker, and will be comparatively smooth.

In the main views I have shown but three rows of stitching, that is to say, the rows 10 and 11, but as shown in Fig. 10, the strips may be stitched in various forms. The operation is one, in the nature of quilting, and this is done after the filling and sealing material has been placed between the layers and worked into the interstices of the material. These stitches serve admirably to further unite the layers so that there is no possibility of their separation in operation, and also to form a number of comparatively minute or small pockets for holding the filling and sealing material.

In the form shown in the fragment c, the stitches are made at right angles producing square pockets d, and in such a case preferably the central stitching is doubled, as indicated at e, so as to still maintain the proper stiffening effect of the arc of the bellows. In the fragment f, oblique stitches g are provided, forming in the main square pockets h, and in the fragment i, the strips are stitched additionally obliquely as indicated at j, forming oblique pockets k. It should be understood, however, that I do not desire to limit myself in any way to the form or manner of stitching these layers together, as obviously, the effect would be substantially the same, regardless of the direction of the stitching, or whether the stitches were straight or undulatory. The effect would be in any event, to unite the layers of fabric to insure their uniform movement together, and to form pockets for the filling and sealing material, and those forms shown in Fig. 10, are merely specimens.

The numeral 14 designates a filler of preservative lubricant, preferably dry powdered graphite, which is filled into these lengthwise or longitudinal pockets formed in the strip, throughout the entire length of the strip, as shown in Fig. 3, which lubricant is worked into the interstices of the fabric completely filling them, in which operation of working in the filler, the filler as a definite visible layer disappears, becoming a homogeneous part of the strip, which assumes a flattened shape, as shown in Fig. 4. It will be noted that the stitches 10 are placed far enough back from the marginal edges of the strip, as to leave considerable marginal edges a for convenient attachment of the strip to the diaphragm rings, as will appear.

After the strip is treated in the way indicated, from the inside, it is placed upon the metallic diaphragm rings and secured thereto by cords 15 in the usual manner, and the cords are coated with shellac, also in the usual manner. Then the inner and outer peripheries of the strip are treated further with a filler and lubricant, which unites and combines with the graphite filling which has been previously introduced between the layers of the strip, as indicated at b in Fig. 7. I have found for this outside treatment that a combination of dry powdered graphite and petroleum jelly, mixed in about the proportions of three ounces of suitable grade graphite, with two pounds of mineral petroleum jelly, produces a grease that gives admirable results.

It will be noted that the construction of the strip is such, that is to say, having pockets and being formed in layers, that it provides for the ready introduction of the powdered graphite, this filler, in combination with the lubricant applied on the outside peripheries of the strip, acting as a preservative lubricant and seal for the fabric, being permanently held in position by the fabric itself. The graphite and other materials used are of such nature as to be practically non-soluble under gases and gas condensates, and form in combination with the fabric, a permanent diaphragm, or rather bellows portion thereof, due to the fact that said lubricant is artificially placed on the outer face and on the inner face of the fabric, and is also contained in the intermediate space between the two layers of the fabric, constituting the finished article.

In the manufacture of the diaphragm, after the straight graphite, the material which is contained between the layers of the strip of fabric, is worked into the interstices of the fabric, and after the filled fabric is additionally stitched as illustrated in Fig. 10, where such additional stitches are employed at all, both sides or outer surfaces of the diaphragm are treated with a graphite grease, which as above stated, is made of a combination or mixture of dry powdered graphite of proper grade and consistency, and a suitable grease, such as petroleum jelly. This grease mixture should be applied to the fabric at a temperature of approximately 120° Fahrenheit.

Merely to show the present method of stitching together sections of leather which go to make up the ordinary leather diaphragm, I have added Fig. 11. Referring to this figure, the numerals 16 and 17 designate two leather sections, whose ends are overlapped as indicated at 18, the sections being stitched together by stitches 19, which it will be observed do not extend entirely through the sections at points exposed to gas action.

Experiment has demonstrated that a diaphragm made of woven fabric, treated in the manner stated, is extremely flexible, and is absolutely gastight, and has also demonstrated, so far as the length of time already consumed in the experiments can demonstrate, is absolutely non-susceptible to the deteriorating actions of the ordinary gas, as well as being absolutely accurate in the measurement of gas passing through the meter.

It has been found also that the provision of the central or longitudinal stitching of the strip forms, after treatment and in the completed article, a stiffened arc for the bellows, thus insuring at all times the proper movement of the bellows, and thus eliminating the likelihood of portions of the bellows folding inward between the diaphragm rings in the collapsing movement of the diaphragm in operation.

Claims:

1. A diaphragm for dry type gas meters, having a bellows portion made of textile material, having its interstices filled and sealed with a preservative lubricant, or a mixture of materials forming a preservative lubricant.

2. A diaphragm for dry type gas meters, having a bellows portion formed of textile fabric, having its interstices filled and sealed with a lubricant consisting of dry graphite, and having its interior and exterior faces treated with a lubricant formed of a mixture of graphite and grease.

3. A diaphragm for dry type gas meters, having the bellows portion thereof formed of a plurality of layers of textile material forming the outer and inner portions of the diaphragm, a filling of sealing material between the layers whereby the interstices of the fabric are sealed and made gastight.

4. A diaphragm for dry type gas meters, having a bellows portion formed of woven fabric arranged in a plurality of layers, a filler between the layers consisting of powdered graphite adapted to fill, seal and lubricate the interstices of the fabric, and an outer coating of a mixture of powdered graphite and grease.

5. A diaphragm for dry type gas meters, having a bellows portion, comprising a strip of woven fabric arranged in a plurality of layers forming a longitudinal pocket or pockets between the layers for the reception of a sealing and lubricating material, whereby the interstices of the fabric are filled.

6. A diaphragm for dry type gas meters, comprising a bellows portion formed of a strip of textile fabric arranged in two layers, thus forming a pocket for the reception of a lubricating and sealing material designed to fill the interstices of the fabric for the purpose set forth.

7. A diaphragm for dry type gas meters, having a bellows portion comprising a strip of woven fabric formed in layers and stitched longitudinally between its marginal edges to form pockets, a filling of powdered graphite within said pockets, an exterior and interior filler, which, when applied to said fabric, will combine with the filler between the fabric layers.

8. A diaphragm for dry type gas meters, having a bellows portion formed of a strip of woven fabric, having a plurality of layers, a row of stitching in the center of said strip forming longitudinal pockets for the reception of a suitable filler designed to fill the interstices of the fabric, said row of stitching also serving to stiffen the arc of said bellows portion, and preventing its collapse while in operation.

9. A diaphragm for dry type gas meters, having a bellows portion formed of a plurality of layers of textile material, a filling of lubricating material between said layers which fills and seals the interstices of the fabric, and a coating of lubricating material on the outer sides of said layers cooperating with the material between the layers for effective sealing and lubrication.

10. A diaphragm for dry type gas meters, having a bellows portion thereof formed of a strip of textile material made in layers, and united at its marginal edges, and united longitudinally intermediate of said edges, the intermediate union serving as a stiffening arc for the bellows, and also forming with the united marginal edges of the strip longitudinal pockets for the reception of a sealing medium for closing the interstices of the fabric.

11. A diaphragm for dry type gas meters, having a bellows portion of a strip of textile material made in layers, and united at its marginal edges, and united longitudinally intermediate of said edges, the intermediate union serving as a stiffening arc for the bellows, and also forming with the united marginal edges of the strip longitudinal pockets, a filling between the layers of dry graphite, and a coating on the inner and outer sides of the layers consisting of a mixture of graphite and mineral grease which unites with the filler between the layers for effective sealing and lubrication.

12. A diaphragm for dry type gas meters, having a bellows portion made of textile material formed in a plurality of layers stitched together for the purpose set forth, and a filling of sealing material between the layers whereby the interstices of the fabric are sealed and made gastight.

13. A diaphragm for dry type gas meters, having a bellows portion made of textile material, formed of a plurality of layers, stitching uniting said layers intermediate of their side edges, and a filling of sealing material between the layers whereby the interstices of the fabric are sealed and made gastight.

14. A diaphragm for dry type gas meters, having a bellows portion formed of a plurality of layers of flexible material, a filler between the layers adapted to fill and seal the interstices of the material, and render said material impervious to gas, and to insure the continued flexibility of the material.

15. A diaphragm for dry type gas meters, having a bellows portion formed of a plurality of layers of flexible material, a filler between the layers adapted to fill and seal the interstices of the material and render said material impervious to gas, and a coating on both outside faces of the layers adapted to combine with the filler between the layers for further effective filling and sealing of said material, and to insure the continued flexibility of the material.

16. A diaphragm for dry type gas meters, having a bellows portion formed of a plurality of layers of flexible material, a filler between the layers adapted to render said material impervious to gas, and to insure the continued flexibility of the material.

17. A diaphragm for dry type gas meters, having a bellows portion formed of a plurality of layers of flexible material, a filler between the layers adapted to render said material impervious to gas, said bellows portion being normally shaped with an annular dome portion and annular edge flanges to facilitate the attachment of the material to the diaphragm rings, substantially as and for the purpose set forth.

In testimony whereof I affix my signature.

EDMUND S. DICKEY.